(12) United States Patent
Ji

(10) Patent No.: US 12,082,166 B2
(45) Date of Patent: Sep. 3, 2024

(54) METHOD AND TERMINAL FOR ALLOCATING PDSCH TIME DOMAIN RESOURCES, AND COMPUTER-READABLE STORAGE MEDIUM

(71) Applicant: VIVO MOBILE COMMUNICATION CO., LTD., Guangdong (CN)

(72) Inventor: Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 757 days.

(21) Appl. No.: 17/147,264

(22) Filed: Jan. 12, 2021

(65) Prior Publication Data

US 2021/0136759 A1    May 6, 2021

Related U.S. Application Data

(63) Continuation of application No. PCT/CN2019/095715, filed on Jul. 12, 2019.

(30) Foreign Application Priority Data

Jul. 13, 2018  (CN) .......................... 201810771945.1

(51) Int. Cl.
 *H04W 72/0446*  (2023.01)
 *H04W 72/51*  (2023.01)
(52) U.S. Cl.
 CPC ....... *H04W 72/0446* (2013.01); *H04W 72/51* (2023.01)
(58) Field of Classification Search
 None
 See application file for complete search history.

(56) References Cited

U.S. PATENT DOCUMENTS

| 2015/0215906 | A1 | 7/2015 | Park et al. |
| 2016/0073385 | A1 | 3/2016 | Park et al. |
| 2017/0230970 | A1 | 8/2017 | Kim et al. |
| 2018/0019843 | A1 | 1/2018 | Papasakellariou |
| 2018/0368114 | A1* | 12/2018 | Chen ....................... H04L 5/001 |
| 2019/0215847 | A1* | 7/2019 | Abdoli ............. H04W 72/0453 |
| 2020/0022175 | A1* | 1/2020 | Xiong ..................... H04L 5/001 |

(Continued)

FOREIGN PATENT DOCUMENTS

| CN | 101998681 A | 3/2011 |
| CN | 104704754 A | 6/2015 |

(Continued)

OTHER PUBLICATIONS

Qualcomm Incorporated, "CA with mixed numerology," 3GPP TSG RAN WG1 Meeting #90, R1-1713456, pp. 1-6, (Aug. 25, 2017).

(Continued)

*Primary Examiner* — Rebecca E Song
(74) *Attorney, Agent, or Firm* — Brooks Kushman P.C.

(57) ABSTRACT

Embodiments of this disclosure provide a method and a terminal for allocating PDSCH time domain resources, and a computer-readable storage medium, where the method is applied to a terminal and includes: starting buffering or receiving, by the terminal, a PDSCH no earlier than a time domain limiting location of the PDSCH, where when SCS of a PDCCH is smaller than SCS of the PDSCH, a time domain location of the PDSCH is not earlier than the time domain limiting location of the PDSCH.

5 Claims, 6 Drawing Sheets

```
┌─────────────────────────────────────────────────────────┐
│ Determine a first intermediate value based on a second  │── 201
│ configuration value of SCS of a PDSCH and a first       │
│ configuration value of SCS of a PDCCH                   │
└─────────────────────────────────────────────────────────┘
                           │
                           ▼
┌─────────────────────────────────────────────────────────┐
│ Based on a correspondence that is preset in a system    │── 202
│ and that is between a time domain limiting location     │
│ and the first intermediate value, determine, as a time  │
│ domain limiting location of the PDSCH, a time domain    │
│ limiting location corresponding to the first            │
│ intermediate value                                       │
└─────────────────────────────────────────────────────────┘
                           │
                           ▼
┌─────────────────────────────────────────────────────────┐
│ A terminal starts buffering or receiving the PDSCH no   │── 203
│ earlier than the time domain limiting location of       │
│ the PDSCH                                                │
└─────────────────────────────────────────────────────────┘
```

(56) References Cited

U.S. PATENT DOCUMENTS

| | | | |
|---|---|---|---|
| 2020/0067676 A1* | 2/2020 | Yi | H04W 72/0446 |
| 2020/0305179 A1 | 9/2020 | Li | |
| 2021/0058940 A1* | 2/2021 | Choi | H04W 72/0453 |

FOREIGN PATENT DOCUMENTS

| | | |
|---|---|---|
| CN | 105682243 A | 6/2016 |
| CN | 106664706 A | 5/2017 |
| CN | 107087442 A | 8/2017 |
| WO | 2017161885 A1 | 9/2017 |

OTHER PUBLICATIONS

Qualcomm Incorporated, "Summary of Maintenance for DL/UL Scheduling," 3GPP TSG-RAN WG1 Meeting #93, R1-1807711, pp. 1-30, (May 24, 2018).

MediaTek Inc., "Remaining issues in carrier aggregation," 3GPP TSG RAN WG1 Meeting #93, R1-1806776, pp. 1-12, (May 25, 2018).

Written Opinion of the International Searching Authority dated Jan. 28, 2021 as received in Application No. PCT/CN2019/095715.

CN Office Action dated Jun. 22, 2020 as received in Application No. 201810771945.1.

European Search Report dated Jul. 20, 2021 as received in application No. 19833910.

"Time-domain resource allocation for NR" 3GPP TSG RAN WG1 NR Ad-Hoc#2, R1-1710165, Qingdao, P.R. China, Jun. 27, 2017. Guangdong Oppo Mobile Telecom.

"Time-domain resource allocation for DL and UL data" 3GPP TSG RAN WG1 NR Ad-Hoc#2, R1-1710566, Qingdao, P.R. China, Jun. 27, 2017. Intel Corporation.

"On NR CA/DC configuration and cross-numerology scheduling" 3GPP TSG-RAN WG1 Meeting #90, R1-1714095, Prague, Czech Republic, Jun. 21, 2017. Nokia.

"Remaining Issues on CA" 3GPP TSG RAN WG1 Meeting #92bis, R1-1804810, Sanya, China, Apr. 16, 2018. Qualcomm Incorporated.

"On remaining details of BWPs" 3GPP TSG-RAN WG1 Meeting #93, R1-1806143, Busan, South Korea, May 21, 2018. Nokia.

MediaTek Inc., "Remaining issues of DLUL scheduling and HARQ management," 3GPP TSG RAN WG1 Meeting #93, R1-1806801, pp. 1-10, (Jan. 12, 2018).

JP Office Action dated Jan. 17, 2022 as received in Application No. 2021-500292.

* cited by examiner

METHOD AND TERMINAL FOR ALLOCATING PDSCH TIME DOMAIN RESOURCES, AND COMPUTER-READABLE STORAGE MEDIUM

CROSS-REFERENCE TO RELATED APPLICATIONS

This application is a continuation application of International Application No. PCT/CN2019/095715 filed on Jul. 12, 2019, which claims priority to Chinese Patent Application No. 201810771945.1, filed in China on Jul. 13, 2018, which is incorporated herein by reference in its entirety.

TECHNICAL FIELD

This disclosure relates to the field of communications technologies, and in particular, to a method and a terminal for allocating PDSCH time domain resources, and a computer-readable storage medium.

BACKGROUND

A 5G NR system supports configuration of one or more carriers (CC) or cells for user equipment (UE). When the UE is configured in a single carrier mode or a self-scheduling mode with carrier aggregation (CA), a plurality of control resource sets (CORESET) and a plurality of search space sets, which include common search space (CSS) and UE-specific search space (USS), can be configured in each CC or cell. A network can flexibly configure a quantity of blind detection for each search space set, and the CORESET may be flexibly associated with the search space set.

If channel quality is not satisfactory or a channel blocking probability is high in some cells, the network may configure cross-carrier scheduling for the UE. To be specific, a control channel is configured in another cell with better channel quality (for example, a primary cell), to schedule data in another cell (for example, a secondary cell) across carriers. A scheduling cell and a scheduled cell may have same or different sub-carrier spacing (SCS). The scheduling cell may be in the self-scheduling mode in which the scheduling cell only schedules itself. If the cross-carrier scheduling is configured for the scheduling cell, the scheduling cell may further schedule one or more scheduled cells in addition to itself. The scheduled cell does not have a physical downlink control channel (PDCCH), and a scheduling operation may be performed only by the scheduling cell.

The UE listens to the PDCCH to receive downlink control information (DCI), and demodulates, based on an indication in the DCI, a physical downlink shared channel (PDSCH) scheduled by a base station. The DCI may flexibly indicate resource allocation of the PDSCH, for example, a cell or a bandwidth part (BWP), a frequency domain resource, and a time domain resource on which the PDSCH is located. The time domain resource may refer to a slot offset of the PDSCH, a start OFDM symbol, a symbol length, and the like. The start OFDM symbol of the PDSCH cannot be earlier than a start OFDM symbol of the PDCCH.

Because a start symbol of the PDSCH may be the same as the start OFDM symbol of the PDCCH, the UE must first buffer data of an entire BWP of the scheduled cell while receiving and blindly detecting the PDCCH. For the self-scheduling or the cross-carrier scheduling, when SCS of the scheduling cell (that is, SCS of the PDCCH) is the same as SCS of the scheduled cell (SCS of the PDSCH), the UE needs to buffer the data of the entire BWP of the scheduled cell until the PDCCH is completely demodulated. However, duration in which the UE receives the PDCCH when the SCS of the PDCCH is smaller than the SCS of the PDSCH is far longer than duration in which the UE receives the PDCCH when the SCS of the PDCCH is the same as the SCS of the PDSCH. Correspondingly, duration in which the UE buffers the data is extended, a data buffer volume of the UE is increased compared with that in a case in which the PDCCH and the PDSCH have the same SCS, and a data buffer load of the UE is increased.

It can be learned that a technical problem that urgently needs to be resolved currently by persons skilled in the art is how to reduce the data buffer load of the UE when the SCS of the PDCCH is smaller than the SCS of the PDSCH.

SUMMARY

Embodiments of this disclosure provide a method and a terminal for allocating PDSCH time domain resources, and a computer-readable storage medium, to resolve a problem that a buffer load of UE is increased when SCS of a PDCCH is smaller than SCS of a PDSCH in a related art.

To resolve the foregoing technical problem, this disclosure is implemented as follows:

According to a first aspect, an embodiment of this disclosure provides a method for allocating PDSCH time domain resources, applied to a terminal, where the method includes: starting buffering or receiving, by the terminal, a PDSCH no earlier than a time domain limiting location of the PDSCH, where when SCS of a PDCCH is smaller than SCS of the PDSCH, a time domain location of the PDSCH is not earlier than the time domain limiting location of the PDSCH.

According to a second aspect, an embodiment of this disclosure further provides a terminal for allocating PDSCH time domain resources, where the terminal includes: a processor, configured to start buffering or receiving a PDSCH no earlier than a time domain limiting location of the PDSCH, where a time domain location of the PDSCH is not earlier than the time domain limiting location of the PDSCH.

According to a third aspect, an embodiment of this disclosure further provides a terminal, including a memory, a processor, and a computer program that is stored in the memory and capable of running on the processor, where when the computer program is executed by the processor, the steps of the method for allocating PDSCH time domain resources are implemented.

According to a fourth aspect, an embodiment of this disclosure further provides a computer-readable storage medium, where the computer-readable storage medium stores a computer program. When the computer program is executed by a processor, the steps of the method for allocating PDSCH time domain resources are implemented.

In the technical solution provided in the embodiments of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

It should be understood that, the technical solutions in the embodiments of this specification may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), a Worldwide Interoperability for Microwave Access (WiMAX) communications system, a 5G system or in other words, a new radio (NR) system, or a later evolved communications system.

In the embodiments of this specification, a terminal device may include but is not limited to a mobile station (MS), a mobile terminal, a mobile phone, user equipment (UE), a handset, portable equipment, a vehicle, and the like. The terminal device may communicate with one or more core networks by using a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

In the embodiments of this specification, a network device is an apparatus that is deployed in the radio access network and that is configured to provide a wireless communication function for the terminal device. The network device may be a base station. The base station may include various forms of macro base stations, micro base stations, relay nodes, access points, and the like. In systems using different radio access technologies, a device having functions of a base station may have different names. For example, in an LTE network, the device having functions of a base station is referred to as an evolved NodeB (evolved NodeB, eNB or eNodeB), in a third generation (3G) network, the device having functions of a base station is referred to as a NodeB (Node B), or the device having functions of a base station is referred to as a network device in a later evolved communications system. However, the wording does not constitute a limitation.

Figure 1:
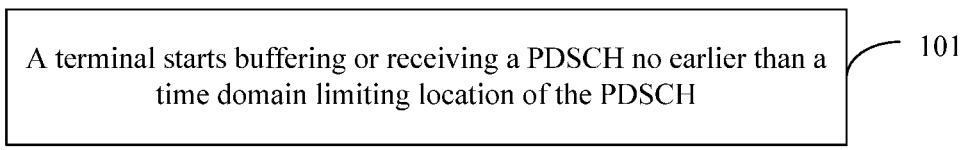
FIG. 1 is a flowchart of a method for allocating PDSCH time domain resources according to an embodiment of this disclosure.

FIG. 1 is a step-based flowchart of a method for allocating PDSCH time domain resources according to some embodiments of this disclosure.

The method for allocating PDSCH time domain resources in this embodiment of this disclosure includes the following step:

Step 101: A terminal starts buffering or receiving a PDSCH no earlier than a time domain limiting location of the PDSCH.

When SCS of a PDCCH is smaller than SCS of the PDSCH, a time domain location of the PDSCH is not earlier than the time domain limiting location of the PDSCH. The time domain location of the PDSCH being no earlier than the time domain limiting location of the PDSCH means that the time domain location of the PDSCH is the same as or later than the time domain limiting location of the PDSCH.

The time domain location of the PDSCH includes one or more of a slot offset of the PDSCH and a start OFDM symbol of the PDSCH. Correspondingly, the time domain limiting location is for limiting the slot offset and/or the start OFDM symbol location.

The time domain limiting location of the PDSCH may be related to one or more of a first configuration value of the SCS of the PDCCH, a second configuration value of the SCS of the PDSCH, processing time of the PDCCH, a time domain length of the PDCCH, a start symbol location of the PDCCH, an end symbol location of the PDCCH, and a reference OFDM symbol. A relationship between the time domain limiting location of the PDSCH and the foregoing one or more factors may be predefined in a protocol, configured by a network device, or determined by the terminal. For the specific relationship between the time domain limiting location of the PDSCH and the foregoing one or more factors, refer to related description in the following embodiments. The specific manner for determining the time domain limiting location of the PDSCH can be set, based on an actual need, by a person skilled in the art, so long as the time domain location of the PDSCH is not earlier than the time domain limiting location of the PDSCH.

The method for allocating PDSCH time domain resources that is provided in this embodiment of this disclosure is applicable to the terminal such as the user equipment UE.

For example, when the time domain limiting location is 5, data of a BWP of the scheduled cell may be buffered from a location of a fifth unit, or the data of the BWP of the scheduled cell may be buffered from a location of a fourth, third, or second unit. In this embodiment of this disclosure, time domain location allocation of the PDSCH is limited, to prevent the terminal from additionally buffering additional data.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 2:
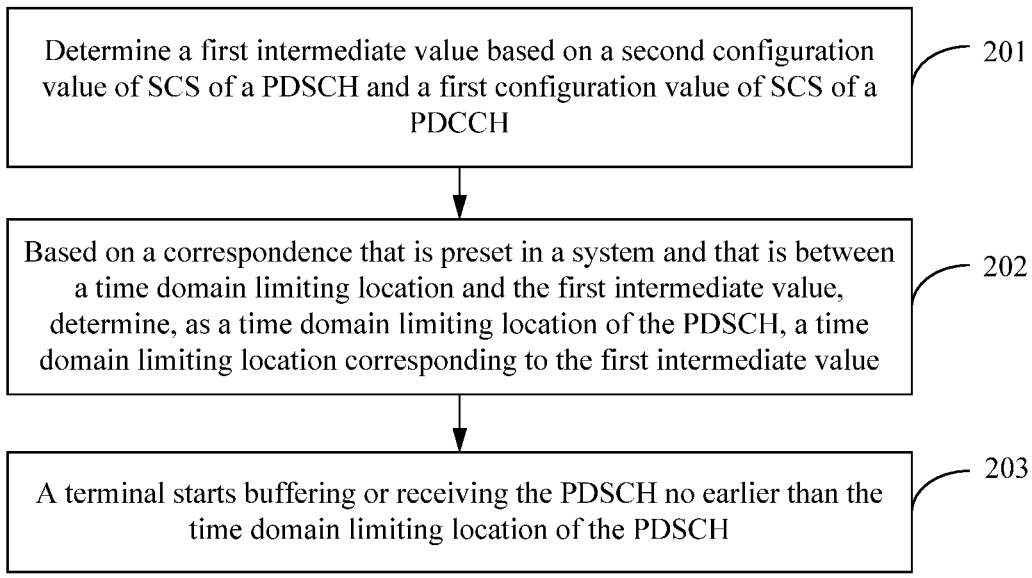
FIG. 2 is a flowchart of a method for allocating PDSCH time domain resources according to an embodiment of this disclosure.

FIG. 2 is a step-based flowchart of a method for allocating PDSCH time domain resources according to some embodiments of this disclosure.

The method for allocating PDSCH time domain resources in this embodiment of this disclosure includes the following steps:

Step 201: Determine a first intermediate value based on a second configuration value of SCS of a PDSCH and a first configuration value of SCS of a PDCCH.

A configuration value of the SCS is denoted by μ. Δf, that is, sub-carrier frequency spacing, corresponding to the configuration value, varies with the configuration value.

Specifically, a correspondence between the configuration value μ of the SCS and Δf is shown in Table 1:

TABLE 1

| μ | $\Delta f = 2^{\mu} \cdot 15$ [kHz] |
|---|---|
| 0 | 15 |
| 1 | 30 |
| 2 | 60 |
| 3 | 120 |
| 4 | 240 |

A network device configures two cells A and B for a terminal through RRC ( ). A is a primary cell, namely, a scheduling cell; and B is a secondary cell, namely, a scheduled cell. A schedules B across carriers. A network side is configured with a PDCCH on a BWP of the cell A. SCS of A is $\mu_{PPCCH}=0$ (that is, 15 kHz), and SCS of B is $\mu_{PDSCH}=2$ (that is, 60 kHz).

$\mu_{PPCCH}$ is the first configuration value, and $\mu_{PDSCH}$ is the second configuration value.

The first intermediate value is a value calculated based on the first configuration value and the second configuration value in accordance with a first preset rule. The first intermediate value may be a difference between the second configuration value and the second configuration, a preset multiple of the difference between the first configuration value and the second configuration value, or a weighted average of the first configuration value and the second configuration value, or the like. The first preset rule may be set, based on an actual need, by a person skilled in the art. This is not specifically limited in this embodiment of this disclosure.

In this embodiment of this disclosure, an example in which the first intermediate value is the difference between the second configuration value and the first configuration value is used for description. In this embodiment of this disclosure, the second configuration value is 2, the first configuration value is 0, and the difference between the second configuration value of the SCS of the PDSCH and the first configuration value of the SCS of the PDCCH is 2−0=2.

Step 202: Based on a correspondence that is preset in a system and that is between a time domain limiting location and the first intermediate value, determine, as a time domain limiting location of the PDSCH, a time domain limiting location corresponding to the first intermediate value.

In this embodiment of this disclosure, an example in which the time domain limiting location is for limiting a slot offset K0 is used for description.

The correspondence that is preset in the system and that is between the time domain limiting location and the first intermediate value may be specifically set, based on an actual need, by a person skilled in the art. Because there may be a plurality of first configuration values and there may also be a plurality of second configuration values, there are a plurality of first intermediate values between the first configuration values and the second configuration values. The system may preset correspondences between different first intermediate values and time domain limiting locations. An exemplary example is shown in Table 2:

TABLE 2

| $\mu_{PDSCH} - \mu_{PDCCH}$ | L (slot) |
|---|---|
| 0 | 0 |
| 1 | 1 |
| 2 | 2 |
| 3 | 3 |

In Table 2, L represents the time domain limiting location.

Because a first difference determined in step 201 is 2, a time domain limiting location L corresponding to the first difference is 2.

In this embodiment of this disclosure, an example in which the time domain limiting location of the PDSCH is determined based on the first configuration value and the second configuration value is used for description. In a specific implementation process, the time domain limiting location of the PDSCH may be a time domain limiting location that is preset in a system. That is, L is a fixed constant that is preset in the system, where K0≥L.

A specific value of the time domain limiting location that is preset in the system may be specifically set, based on an actual need, by a person skilled in the art. For example, the value of the time domain limiting location is set to 1, 2, 3 or the like. This is not specifically limited in this embodiment of this disclosure.

Step 203: The terminal starts buffering or receiving the PDSCH no earlier than the time domain limiting location of the PDSCH.

When the SCS of the PDCCH is smaller than the SCS of the PDSCH, a time domain location of the PDSCH is not earlier than the time domain limiting location of the PDSCH.

After the time domain limiting location of the PDSCH is determined, when blindly detecting the PDCCH, the terminal may start buffering data only from time indicated by the time domain limiting location, that is, K0=L, until DCI is demodulated; and the terminal receives the PDSCH based on a time domain location K0 actually indicated by the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 3:
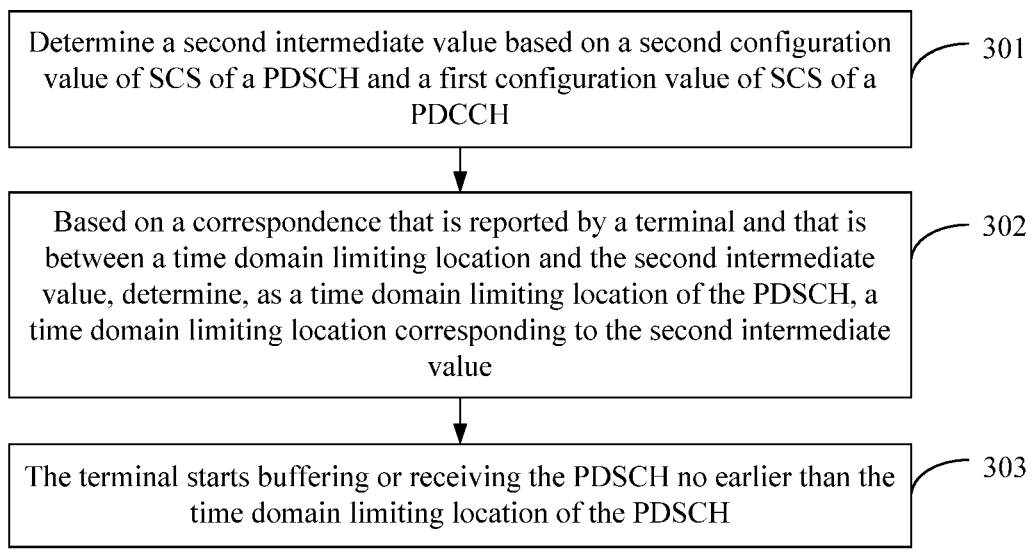
FIG. 3 is a flowchart of a method for allocating PDSCH time domain resources according to an embodiment of this disclosure.

FIG. 3 is a step-based flowchart of a method for allocating PDSCH time domain resources according to some embodiments of this disclosure.

The method for allocating PDSCH time domain resources in this embodiment of this disclosure includes the following steps:

Step 301: Determine a second intermediate value based on a second configuration value of SCS of a PDSCH and a first configuration value of SCS of a PDCCH.

A network device configures two cells A and B for a terminal through radio resource control (RRC). A is a primary cell, namely, a scheduling cell; and B is a secondary cell, namely, a scheduled cell. A schedules B across carriers. A network side is configured with a PDCCH on a BWP of the cell A. SCS of A is $\mu_{PPCCH}=0$ (that is, 15 kHz), and SCS of B is $\mu_{PDSCH}=2$ (that is, 60 kHz).

$\mu_{PDCCH}$ is the first configuration value, and $\mu_{PDSCH}$ is the second configuration value. The second intermediate value is a value calculated based on the first configuration value and the second configuration value in accordance with a second preset rule. The second intermediate value may be a difference between the second configuration value and the second configuration, a preset multiple of the difference between the first configuration value and the second configuration value, or a weighted average of the first configuration value and the second configuration value, or the like. The first preset rule may be set, based on an actual need, by a person skilled in the art. This is not specifically limited in this embodiment of this disclosure.

In this embodiment of this disclosure, an example in which the second intermediate value is the difference between the second configuration value and the first configuration value is used for description. In this embodiment of this disclosure, the second configuration value is 2, the first configuration value is 0, and the difference between the second configuration value and the first configuration value is 2−0=2. That is, the second intermediate value is 2.

Step 302: Based on a correspondence that is reported by the terminal and that is between a time domain limiting location and the second intermediate value, determine, as a time domain limiting location of the PDSCH, a time domain limiting location corresponding to the second intermediate value.

In this embodiment of this disclosure, an example in which the time domain limiting location is for limiting a slot offset K0 is still used for description. K0≥L, which indicates the time domain limiting location.

The correspondence between the time domain limiting location and the second intermediate value may be reported by the terminal. Because there may be a plurality of first configuration values and there may also be a plurality of second configuration values, there are a plurality of second intermediate values between the first configuration values and the second configuration values. The terminal may report correspondences between different second intermediate values and time domain limiting locations. An example in Table 3 shows a group of correspondences that are reported by the terminal and that are between time domain limiting locations and second intermediate values.

TABLE 3

| $\mu_{PDSCH} - \mu_{PDCCH}$ | L (slot) |
|---|---|
| 0 | 0 |
| 1 | 0 |
| 2 | 1 |
| 3 | 2 |

It should be noted that, in Table 3, a slot unit is used as an example for description. An OFDM symbol may alternatively be used as a unit in a specific implementation process.

Because the second intermediate value determined in step 301 is 2, it may be learned from Table 3 that a time domain limiting location L corresponding to the second intermediate value is 2.

In a specific implementation process, L may alternatively be reported by the terminal with a reporting capability, where the terminal directly or indirectly informs a network of the time domain limiting location L supported by the terminal.

Step 303: The terminal starts buffering or receiving the PDSCH no earlier than the time domain limiting location of the PDSCH.

When the SCS of the PDCCH is smaller than the SCS of the PDSCH, a time domain location of the PDSCH is not earlier than the time domain limiting location of the PDSCH.

When blindly detecting the PDCCH, the terminal may start buffering data only from time indicated by the time domain limiting location, that is, K0=L, until DCI is demodulated; and the terminal receives the PDSCH based on a time domain location K0 actually indicated by the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 4:
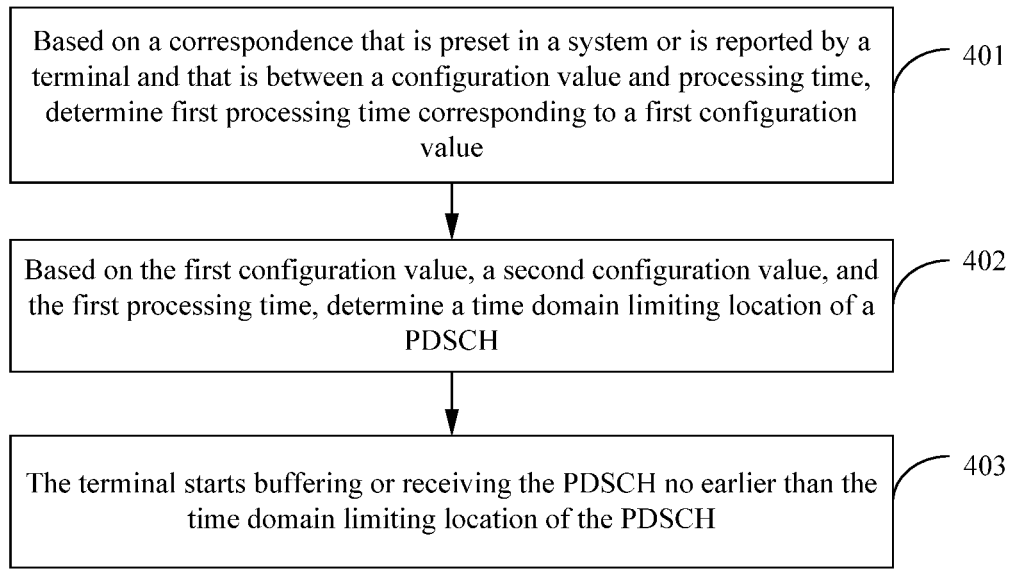
FIG. 4 is a flowchart of a method for allocating PDSCH time domain resources according to an embodiment of this disclosure.

FIG. 4 is a step-based flowchart of a method for allocating PDSCH time domain resources according to some embodiments of this disclosure.

The method for allocating PDSCH time domain resources in this embodiment of this disclosure includes the following steps.

Step 401: Based on a correspondence that is preset in a system or is reported by a terminal and that is between a configuration value and processing time, determine first processing time corresponding to a first configuration value.

The correspondence between the configuration value and the processing time may be preset in the system or reported by the terminal.

A network device configures two cells A and B for the terminal through RRC. A is a primary cell, namely, a scheduling cell; and B is a secondary cell, namely, a scheduled cell. A schedules B across carriers. A network side configures a PDCCH on a BWP of the cell A. SCS of A is $\mu_{PDCCH}=0$ (that is, 15 kHz), and SCS of B is $\mu_{PDSCH}=2$ (that is, 60 kHz).

$\mu_{PDCCH}$ is a first configuration value of SCS of the PDCCH, and $\mu_{PDSCH}$ is a second configuration value of SCS of the PDSCH. The first configuration value is 0 and the second configuration value is 2.

In this embodiment of this disclosure, an example in which a time domain limiting location is for limiting a slot offset K0 is used for description.

An example in Table 4 shows a group of correspondences that are reported by the terminal and that are between configuration values and processing time.

TABLE 4

| $\mu_{PDCCH}$ | S (symbols) |
| --- | --- |
| 0 | 4 |
| 1 | 7 |
| 2 | 14 |
| 3 | 27 |

The first configuration value that can be determined through the foregoing configuration is 0, and processing time S corresponding to the first configuration value can be determined to be 4 Through Table 4.

Step 402: Based on the first configuration value, the second configuration value, and the first processing time, determine a time domain limiting location of the PDSCH.

Specifically, the time domain limiting location of the PDSCH can be determined by using a formula 1:

$$M = \left\lfloor \left( S \times \frac{2^{\mu}PDSCH}{2^{\mu}PDCCH} \right) \middle/ 14 \right\rfloor.$$

M in the formula 1 is the time domain limiting location, K0≥M, and the first configuration value, the second configuration value, and a value of first processing time are substituted into the formula 1 to calculate a value of M.

Step 403: The terminal starts buffering or receiving the PDSCH no earlier than the time domain limiting location of the PDSCH.

When the SCS of the PDCCH is smaller than the SCS of the PDSCH, a time domain location of the PDSCH is not earlier than the time domain limiting location of the PDSCH.

After the time domain limiting location of the PDSCH is determined, when blindly detecting the PDCCH, the terminal may start buffering data only from time indicated by the time domain limiting location, that is, K0=M, until DCI is demodulated; and the terminal receives the PDSCH based on a time domain location K0 actually indicated by the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 5:
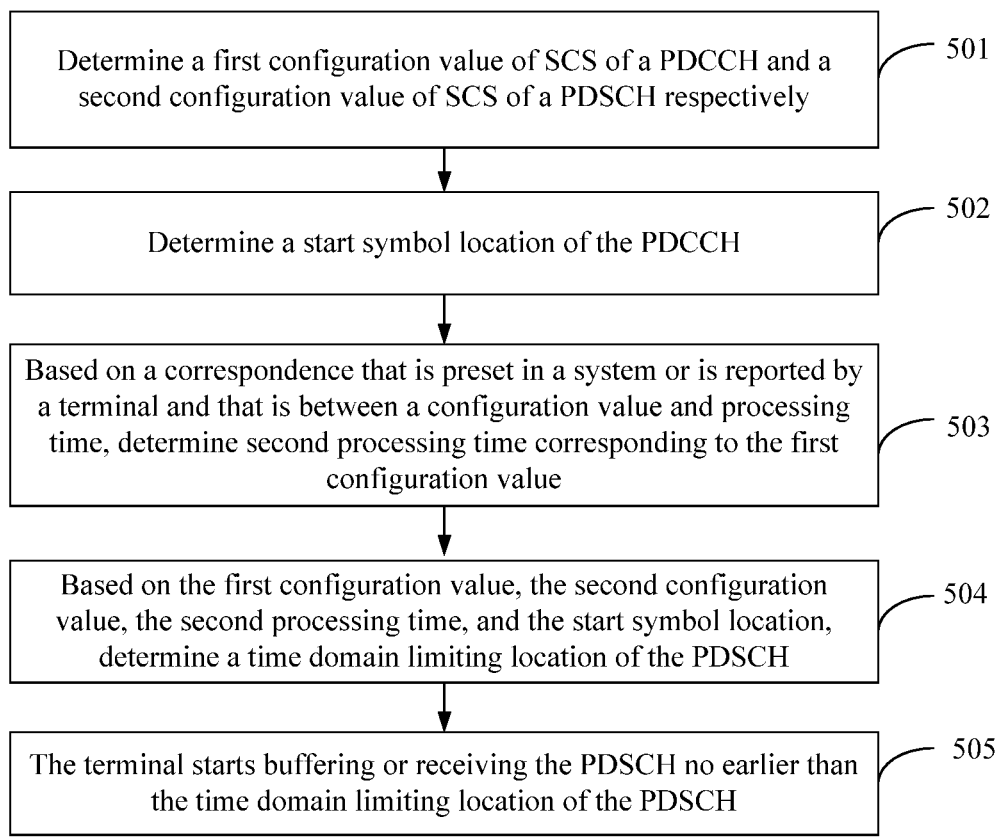
FIG. 5 is a flowchart of a method for allocating PDSCH time domain resources according to an embodiment of this disclosure.

FIG. 5 is a step-based flowchart of a method for allocating PDSCH time domain resources according to some embodiments of this disclosure.

The method for allocating PDSCH time domain resources in this embodiment of this disclosure includes the following steps:

Step 501: Determine a first configuration value of SCS of a PDCCH and a second configuration value of SCS of a PDSCH respectively.

A network device configures two cells A and B for a terminal through radio resource control (RRC). A is a primary cell, namely, a scheduling cell; and B is a secondary cell, namely, a scheduled cell. A schedules B across carriers. A network side is configured with a PDCCH on a BWP of the cell A. SCS of A is $\mu_{PPCCH}=0$ (that is, 15 kHz), and SCS of B is $\mu_{PDSCH}=2$ (that is, 60 kHz).

$\mu_{PPCCH}$ is the first configuration value, and $\mu_{PDSCH}$ is the second configuration value. The first configuration value is 0 and the second configuration value is 2.

Step 502: Determine a start symbol location of the PDCCH.

In this embodiment of this disclosure, an example in which a time domain limiting location is for limiting a slot offset K0 is used for description.

The PDCCH occupies 1, 2, or 3 OFDM symbols in each subframe in a time domain. In this step, the start symbol location occupied by the PDCCH is determined. The start symbol location may be denoted by R. In this embodiment of this disclosure, an example indicating R=3 is used for description.

Step 503: Based on a correspondence that is preset in a system or is reported by the terminal and that is between a configuration value and processing time, determine second processing time corresponding to the first configuration value.

The correspondence between the configuration value and the processing time may be preset in the system or reported by the terminal.

An example in Table 5 shows a group of correspondences that are reported by the terminal and that are between configuration values and processing time.

TABLE 5

| $\mu_{PDCCH}$ | S (symbols) |
| --- | --- |
| 0 | 3 |
| 1 | 6 |
| 2 | 12 |
| 3 | 24 |

In Step 501, the determined first configuration value is 0, and processing time S corresponding to the first configuration value can be determined to be 3 through Table 5.

Step 504: Based on the first configuration value, the second configuration value, the second processing time, and the start symbol location, determine a time domain limiting location of the PDSCH.

Specifically, the time domain limiting location of the PDSCH may be determined by using a formula 2:

$$M = \left\lfloor \left( (R+S) \times \frac{2^{\mu}PDSCH}{2^{\mu}PDCCH} \right) \middle/ 14 \right\rfloor.$$

M in the formula 2 is the time domain limiting location, K0≥M, and the first configuration value, the second configuration value, the start symbol location of the PDCCH, and the second processing time are substituted into the formula 2 to obtain a value of M.

In a specific implementation process, an end symbol location of the PDCCH may also be determined. Based on the first configuration value, the second configuration value, the second processing time, and the end symbol location, the time domain limiting location of the PDSCH is determined.

Step 505: The terminal starts buffering or receiving the PDSCH no earlier than the time domain limiting location of the PDSCH.

When the SCS of the PDCCH is smaller than the SCS of the PDSCH, a time domain location of the PDSCH is not earlier than the time domain limiting location of the PDSCH.

After the time domain limiting location of the PDSCH is determined, when blindly detecting the PDCCH, the terminal may start buffering data only from time indicated by the time domain limiting location, that is, K0=M, until DCI is demodulated; and the terminal receives the PDSCH based on a time domain location K0 actually indicated by the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 6:
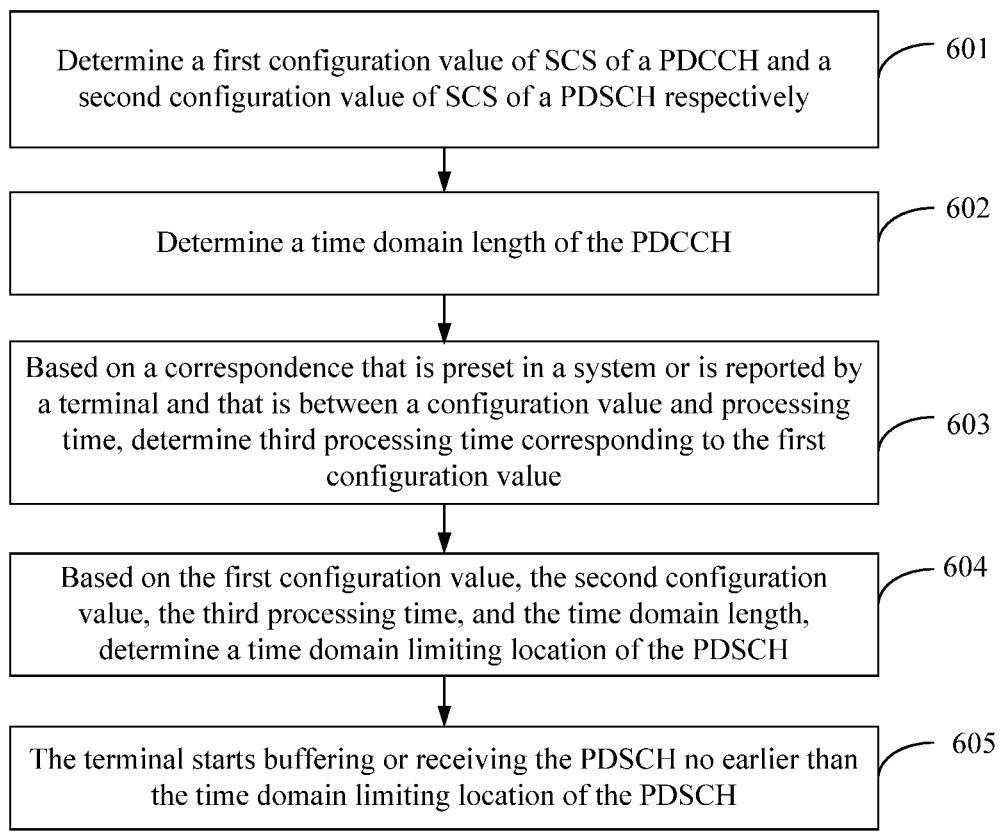
FIG. 6 is a flowchart of a method for allocating PDSCH time domain resources according to an embodiment of this disclosure.

FIG. 6 is a step-based flowchart of a method for allocating PDSCH time domain resources according to some embodiments of this disclosure.

In this embodiment of this disclosure, an example in which a time domain limiting location of a PDSCH is determined based on a first configuration value of SCS of a PDCCH, a second configuration value of SCS of the PDSCH, and a time domain length of the PDCCH is used for description. The method for allocating PDSCH time domain resources in this embodiment of this disclosure includes the following steps:

Step 601: Determine the first configuration value of the SCS of the PDCCH and the second configuration value of the SCS of the PDSCH respectively.

A network device configures two cells A and B for a terminal through radio resource control (RRC). A is a primary cell, namely, a scheduling cell; and B is a secondary cell, namely, a scheduled cell. A schedules B across carriers. A network side is configured with a PDCCH on a BWP of the cell A. SCS of A is $\mu_{PDCCH}$=0 (that is, 15 kHz), and SCS of B is $\mu_{PDSCH}$=2 (that is, 60 kHz).

$\mu_{PDCCH}$ is the first configuration value, and $\mu_{PDSCH}$ is the second configuration value. The first configuration value is 0 and the second configuration value is 2.

Step 602: Determine a time domain length of the PDCCH.

In this embodiment of this disclosure, an example in which a time domain length D of the PDCCH is 3 OFDM symbols is used for description, that is, D=3.

Step 603: Based on a correspondence that is preset in a system or is reported by the terminal and that is between a configuration value and processing time, determine third processing time corresponding to the first configuration value.

The correspondence between the configuration value and the processing time may be preset in the system or reported by the terminal.

An example in Table 6 shows a group of correspondences that are reported by the terminal and that are between configuration values and the processing time.

TABLE 6

| $\mu_{PDCCH}$ | S (symbols) |
|---|---|
| 0 | 3 |
| 1 | 6 |
| 2 | 12 |
| 3 | 24 |

In Step 601, the determined first configuration value is 0, and third processing time S corresponding to the first configuration value can be determined to be 3 through Table 6.

Step 604: Based on the first configuration value, the second configuration value, the third processing time, and the time domain length, determine the time domain limiting location of the PDSCH.

In this embodiment of this disclosure, an example in which the time domain limiting location is for limiting a slot offset K0 is used for description.

Specifically, the time domain limiting location of the PDSCH may be determined by using a formula 3:

$$M = \left\lceil \left((D+S) \times \frac{2^{\mu}PDSCH}{2^{\mu}PDCCH}\right) / 14 \right\rceil.$$

M in the formula 3 is the time domain limiting location, K0≥M, and the first configuration value, the second configuration value, D determined in step 602, and S determined in step 603 are substituted into the formula 3 to obtain a value of M.

Step 605: The terminal starts buffering or receiving the PDSCH no earlier than the time domain limiting location of the PDSCH.

When the SCS of the PDCCH is smaller than the SCS of the PDSCH, a time domain location of the PDSCH is not earlier than the time domain limiting location of the PDSCH.

After the time domain limiting location of the PDSCH is determined, when blindly detecting the PDCCH, the terminal may start buffering data only from time indicated by the time domain limiting location, that is, K0=M, until DCI is demodulated; and the terminal receives the PDSCH based on a time domain location K0 actually indicated by the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 7:
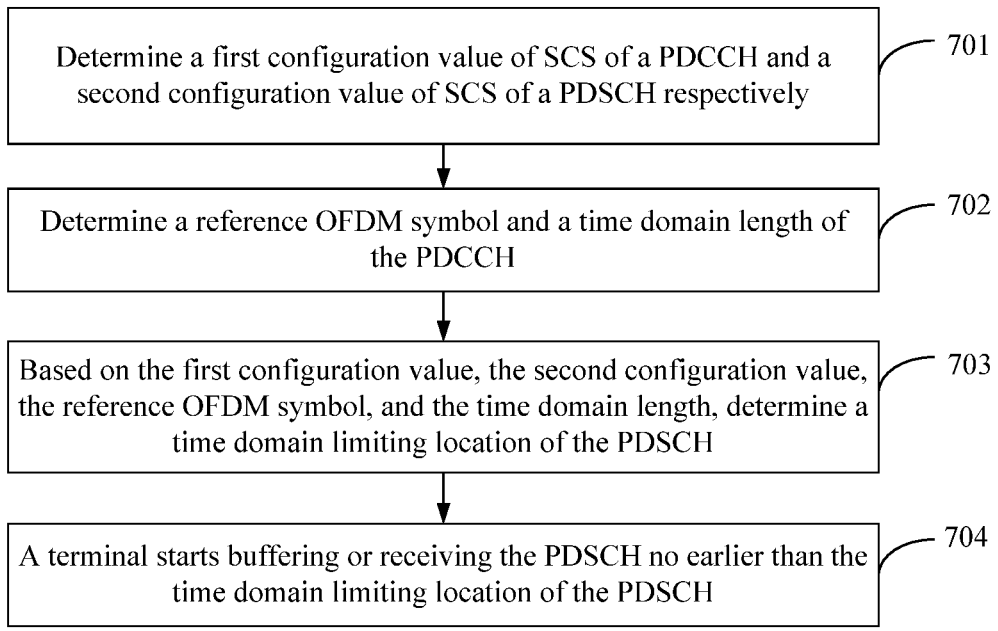
FIG. 7 is a flowchart of a method for allocating PDSCH time domain resources according to an embodiment of this disclosure.

FIG. 7 is a step-based flowchart of a method for allocating PDSCH time domain resources according to some embodiments of this disclosure.

In this embodiment of this disclosure, an example in which a time domain limiting location of a PDSCH is determined based on a first configuration value of SCS of a PDCCH, a second configuration value of SCS of the PDSCH, a reference OFDM symbol, and a time domain length of the PDCCH is used for description. The method for allocating PDSCH time domain resources in this embodiment of this disclosure includes the following steps:

Step 701: Determine the first configuration value of the SCS of the PDCCH and the second configuration value of the SCS of the PDSCH respectively.

A network device configures two cells A and B for a terminal through radio resource control (RRC). A is a primary cell, namely, a scheduling cell; and B is a secondary cell, namely, a scheduled cell. A schedules B across carriers. A network side is configured with a PDCCH on a BWP of the cell A. SCS of A is $\mu_{PDCCH}=0$ (that is, 15 kHz), and SCS of B is $\mu_{PDSCH}=2$ (that is, 60 kHz).

$\mu_{PPCCH}$ is the first configuration value, and $\mu_{PDSCH}$ is the second configuration value.

Step 702: Determine the reference OFDM symbol and the time domain length of the PDCCH.

The reference OFDM symbol may be denoted by P, and the time domain length may be denoted by D. In this embodiment of this disclosure, an example indicating P=2 and D=3 is used for description. When P is equal to 2, this indicates that the reference OFDM symbol is the second OFDM symbol.

Step 703: Based on the first configuration value, the second configuration value, the reference OFDM symbol, and the time domain length, determine the time domain limiting location of the PDSCH.

In this embodiment of this disclosure, an example in which the time domain limiting location is for limiting a start OFDM symbol of the PDSCH is used for description.

Specifically, the time domain limiting location of the PDSCH may be determined by using a formula 4:

$$T = D \times \frac{2^{\mu PDSCH}}{2^{\mu PDCCH}}.$$

T in the formula 4 is the time domain limiting location, K0≥T, and the first configuration value, the second configuration value, and D and P determined in step 702 are substituted into the formula 4 to obtain a value of T.

In this embodiment of this disclosure, values corresponding to the foregoing parameters are substituted into the formula 4 to obtain that T=10. Therefore, spacing between a start symbol location of the PDSCH that is indicated by DCI and a start symbol location of the PDCCH cannot be less than T OFDM symbols.

Step 704: The terminal starts buffering or receiving the PDSCH no earlier than the time domain limiting location of the PDSCH.

If T=10, when blindly detecting the PDCCH, the terminal may start buffering data only from a tenth symbol following a start location of the PDCCH, until the DCI is demodulated; and the terminal receives the PDSCH based on an actual indication in the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 8:
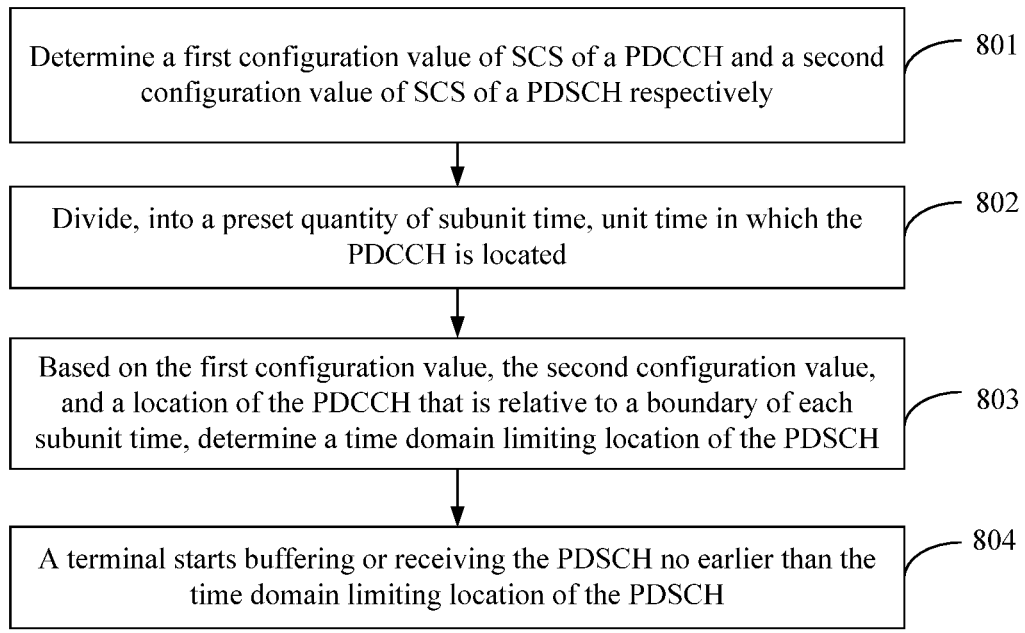
FIG. 8 is a flowchart of a method for allocating PDSCH time domain resources according to an embodiment of this disclosure.

FIG. 8 is a step-based flowchart of a method for allocating PDSCH time domain resources according to some embodiments of this disclosure.

In this embodiment of this disclosure, an example in which a time domain limiting location of a PDSCH is related to a first configuration value, a second configuration value, and a location of a PDCCH that is relative to a boundary of each subunit time is used for description. A relationship between the time domain limiting location of the PDSCH and the first configuration value, the second configuration value, and the location of the PDCCH that is relative to the boundary of each subunit time may be predefined in a protocol, configured by a network device, or determined by a terminal. Unit time in which the PDCCH is located includes a preset quantity of subunit time.

The method for allocating PDSCH time domain resources in this embodiment of this disclosure includes the following steps:

Step 801: When SCS of a PDCCH is smaller than SCS of a PDSCH, determine a first configuration value of the SCS of the PDCCH and a second configuration value of the SCS of the PDSCH respectively.

A network device configures two cells A and B for a terminal through radio resource control (RRC). A is a primary cell, namely, a scheduling cell; and B is a secondary cell, namely, a scheduled cell. A schedules B across carriers. A network side is configured with a PDCCH on a BWP of the cell A. SCS of A is $\mu_{PPCCH}=0$, and SCS of B is $\mu_{PDSCH}=2$, where $\mu_{PPCCH}$ is less than $\mu_{PDSCH}$. That is, the SCS of the PDCCH is smaller than the SCS of the PDSCH. $\mu_{PDCCH}$ is the first configuration value, and $\mu_{PDSCH}$ is the second configuration value.

Step 802: Divide, into a preset quantity of subunit time, the unit time in which the PDCCH is located.

In a specific implementation process, the unit time may be a slot, and the preset quantity may be 4. Certainly, the preset quantity is not limited thereto, and may also be set to 3, 5, or the like.

Based on the SCS of the PDCCH, the slot in which the PDCCH is located is divided into four sub-slots, and boundary symbol numbers $S_k$ of the sub-slots $\{k=0, 1, 2, 3\}$ are sequentially 0, 4, 7, and 11. The sub-slot is the subunit time.

Step 803: Based on the first configuration value, the second configuration value, and the location of the PDCCH that is relative to the boundary of each subunit time, determine the time domain limiting location of the PDSCH.

In this embodiment of this disclosure, an example in which the time domain limiting location is for limiting a slot offset K0 is used for description.

In a specific implementation process, based on the first configuration value, the second configuration value, and the location of the PDCCH that is relative to the boundary of each subunit time, the time domain limiting location of the PDSCH is determined in the following specific manner:

First, a sub-slot j in which the PDCCH is located is determined by using a number of a last symbol of the PDCCH.

In this embodiment of this disclosure, an example indicating j=1 is used for description. j=1 indicates that the PDCCH is on a first sub-slot.

Then, based on the sub-slot in which the PDCCH is located, a start symbol offset O of an earliest PDSCH is determined. In this embodiment of this disclosure, an example indicating O=1 is used for description.

Then, based on the sub-slot j and the offset O, a start symbol P of the earliest PDSCH is determined.

k=(j+O)=2, and $S_k=7$, where a boundary symbol corresponding to $S_2$ is 7, and therefore, $S_k=7$.

Based on a formula 5:

$$P = \left\lfloor \left( S_k \times \frac{2^\mu PDSCH}{2^\mu PDCCH} \right) / 14 \right\rfloor,$$

the start symbol P of the earliest PDSCH is determined, that is, the time domain limiting location, where K0≥P.

The first configuration value $\mu_{PDCCH}$, the second configuration value $\mu_{PDSCH}$, and $S_k$ are substituted into the foregoing formula 5 to obtain a value of P.

Step 804: The terminal starts buffering or receiving the PDSCH no earlier than the time domain limiting location of the PDSCH.

When the SCS of the PDCCH is smaller than the SCS of the PDSCH, a time domain location of the PDSCH is not earlier than the time domain limiting location of the PDSCH.

After the time domain limiting location of the PDSCH is determined, when blindly detecting the PDCCH, the terminal may start buffering data only from time indicated by the time domain limiting location, that is, K0=P, until DCI is demodulated; and the terminal receives the PDSCH based on a time domain location K0 actually indicated by the DCI.

In the method for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 9:
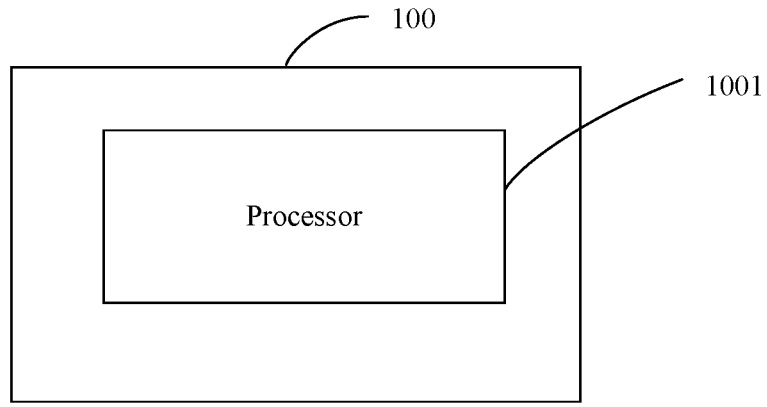
FIG. 9 is a schematic structural diagram of a terminal for allocating PDSCH time domain resources according to an embodiment of this disclosure.

FIG. 9 is a schematic structural diagram of a terminal for allocating PDSCH time domain resources according to some embodiments of this disclosure.

The terminal 100 for allocating PDSCH time domain resources that is provided in this embodiment of this disclosure includes: a processor 1001, where the processor 1001 is configured to start buffering or receiving a PDSCH no earlier than a time domain limiting location of the PDSCH, where when SCS of a PDCCH is smaller than SCS of the PDSCH, a time domain location of the PDSCH is not earlier than the time domain limiting location of the PDSCH.

Optionally, the time domain limiting location of the PDSCH is related to one or more of a first configuration value of the SCS of the PDCCH, a second configuration value of the SCS of the PDSCH, processing time of the PDCCH, a time domain length of the PDCCH, a start symbol location of the PDCCH, an end symbol location of the PDCCH, and a reference OFDM symbol.

Optionally, a relationship between the time domain limiting location of the PDSCH and the one or more of the first configuration value of the SCS of the PDCCH, the second configuration value of the SCS of the PDSCH, the processing time of the PDCCH, the time domain length of the PDCCH, the start symbol location of the PDCCH, the end symbol location of the PDCCH, and the reference OFDM symbol is predefined in a protocol, or is configured by a network device, or is determined by the terminal.

Optionally, the time domain limiting location of the PDSCH is determined in the following manner determining a first intermediate value based on the second configuration value and the first configuration value; and based on a correspondence that is preset in a system and that is between a time domain limiting location and the first intermediate value, determining, as the time domain limiting location of the PDSCH, a time domain limiting location corresponding to the first intermediate value.

Optionally, the time domain limiting location of the PDSCH is determined in the following manner determining a second intermediate value based on the second configuration value and the first configuration value; and based on a correspondence that is reported by the terminal and that is between a time domain limiting location and the second intermediate value, determining, as the time domain limiting location of the PDSCH, a time domain limiting location corresponding to the second intermediate value.

Optionally, the time domain limiting location of the PDSCH is determined in the following manner based on a correspondence that is preset in a system or is reported by the terminal and that is between a configuration value and the processing time, determining first processing time corresponding to the first configuration value; and based on the first configuration value, the second configuration value, and the first processing time, determining the time domain limiting location of the PDSCH.

Optionally, the time domain limiting location of the PDSCH is determined in the following manner: based on a correspondence that is preset in a system or is reported by the terminal and that is between a configuration value and the processing time, determining second processing time corresponding to the first configuration value; and based on the first configuration value, the second configuration value, the second processing time, and the start symbol or end symbol location, determining the time domain limiting location of the PDSCH.

Optionally, the time domain limiting location of the PDSCH is determined in the following manner: based on a correspondence that is preset in a system or is reported by the terminal and that is between a configuration value and the processing time, determining third processing time corresponding to the first configuration value; and based on the first configuration value, the second configuration value, the third processing time, and the time domain length of the PDCCH, determining the time domain limiting location of the PDSCH.

Optionally, the time domain limiting location of the PDSCH is a time domain limiting location that is preset in a system.

Optionally, the time domain limiting location of the PDSCH is related to the first configuration value of the SCS of the PDCCH, the second configuration value of the SCS of the PDSCH, and a location of the PDCCH that is relative to a boundary of each subunit time, where unit time in which the PDCCH is located includes a preset quantity of subunit time.

Based on the terminal for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

Figure 10:
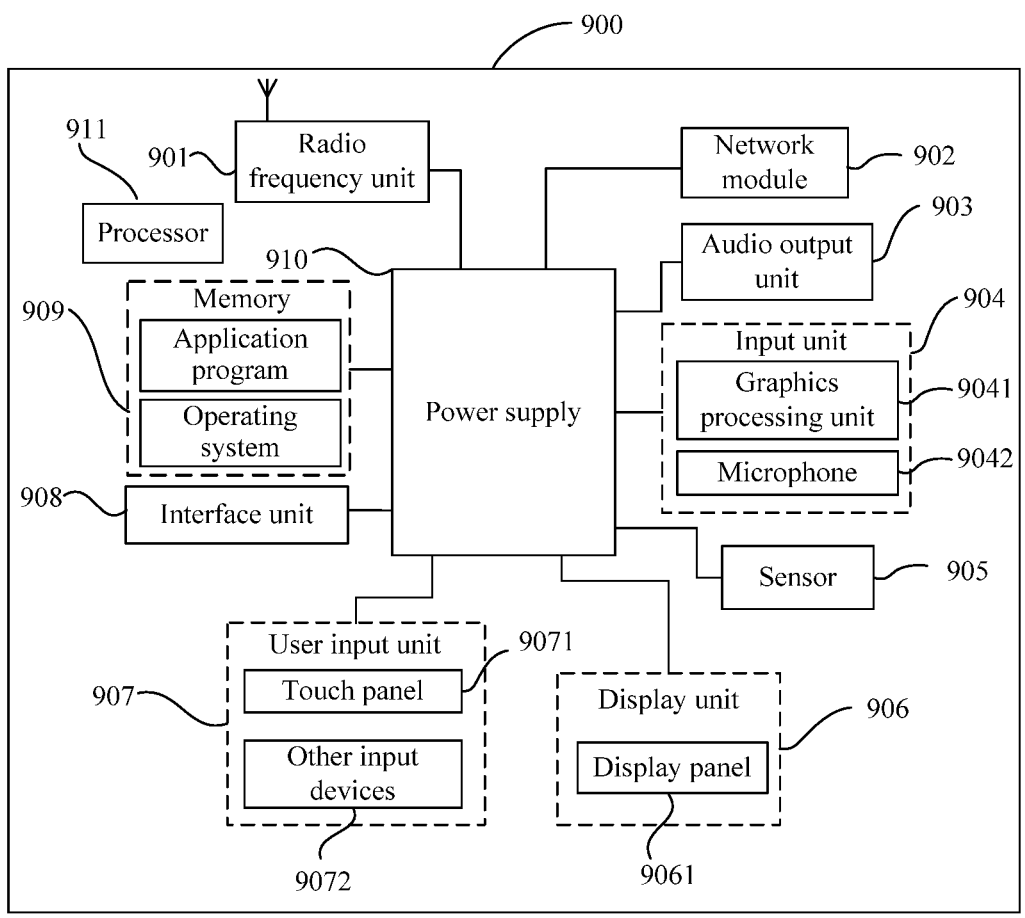
FIG. 10 is a schematic structural diagram of a terminal according to an embodiment of this disclosure.

FIG. 10 is a structural block diagram of a terminal according to some embodiments of this disclosure.

FIG. 10 is a schematic diagram of a hardware structure of a terminal for implementing the embodiments of this disclosure. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 10 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 910 is configured to start buffering or receiving a PDSCH no earlier than a time domain limiting location of the PDSCH, where when SCS of a PDCCH is smaller than SCS of the PDSCH, a time domain location of the PDSCH is not earlier than the time domain limiting location of the PDSCH.

Optionally, the time domain limiting location of the PDSCH is related to one or more of a first configuration value of the SCS of the PDCCH, a second configuration value of the SCS of the PDSCH, processing time of the PDCCH, a time domain length of the PDCCH, a start symbol location of the PDCCH, an end symbol location of the PDCCH, and a reference OFDM symbol.

Optionally, a relationship between the time domain limiting location of the PDSCH and the one or more of the first configuration value of the SCS of the PDCCH, the second configuration value of the SCS of the PDSCH, the processing time of the PDCCH, the time domain length of the PDCCH, the start symbol location of the PDCCH, the end symbol location of the PDCCH, and the reference OFDM symbol is predefined in a protocol, or is configured by a network device, or is determined by the terminal.

Optionally, the time domain limiting location of the PDSCH is determined in the following manner: determining a first intermediate value based on the second configuration value and the first configuration value; and based on a correspondence that is preset in a system and that is between a time domain limiting location and the first intermediate value, determining, as the time domain limiting location of the PDSCH, a time domain limiting location corresponding to the first intermediate value.

Optionally, the time domain limiting location of the PDSCH is determined in the following manner: determining a second intermediate value based on the second configuration value and the first configuration value; and based on a correspondence that is reported by the terminal and that is between a time domain limiting location and the second intermediate value, determining, as the time domain limiting location of the PDSCH, a time domain limiting location corresponding to the second intermediate value.

Optionally, the time domain limiting location of the PDSCH is determined in the following manner: based on a correspondence that is preset in a system or is reported by the terminal and that is between a configuration value and the processing time, determining first processing time corresponding to the first configuration value; and based on the first configuration value, the second configuration value, and the first processing time, determining the time domain limiting location of the PDSCH.

Optionally, the time domain limiting location of the PDSCH is determined in the following manner: based on a correspondence that is preset in a system or is reported by the terminal and that is between a configuration value and the processing time, determining second processing time corresponding to the first configuration value; and based on the first configuration value, the second configuration value, the second processing time, and the start symbol or end symbol location, determining the time domain limiting location of the PDSCH.

Optionally, the time domain limiting location of the PDSCH is determined in the following manner: based on a correspondence that is preset in a system or is reported by the terminal and that is between a configuration value and the processing time, determining third processing time corresponding to the first configuration value; and based on the first configuration value, the second configuration value, the third processing time, and the time domain length of the PDCCH, determining the time domain limiting location of the PDSCH.

Optionally, the time domain limiting location of the PDSCH is a time domain limiting location that is preset in a system.

Optionally, the time domain limiting location of the PDSCH is related to the first configuration value of the SCS of the PDCCH, the second configuration value of the SCS of the PDSCH, and a location of the PDCCH that is relative to a boundary of each subunit time, where unit time in which the PDCCH is located includes a preset quantity of subunit time.

Based on the terminal for allocating PDSCH time domain resources that is provided in this embodiment of this disclosure, the terminal starts buffering or receiving the PDSCH no earlier than the time domain limiting location of the PDSCH, where when the SCS of the PDCCH is smaller than the SCS of the PDSCH, the time domain location of the PDSCH is not earlier than the time domain limiting location of the PDSCH. Compared with those in a related art of starting buffering data when receiving of the PDCCH starts, a data buffer volume may be reduced, and power consumption is reduced.

It should be understood that in this embodiment of this disclosure, the radio frequency unit 901 may be configured to: receive and send information, or to receive and send a signal in a call process, and specifically, after receiving downlink data from a base station, send the downlink data to the processor 910 for processing; and also send uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may further communicate with a network and another device through a wireless communications system.

The terminal provides the user with wireless broadband Internet access by using the network module 902, for example, helps the user send or receive an email, browse a web page, access streaming media, and the like.

The audio output unit 903 may convert audio data received by the radio frequency unit 901 or the network module 902 or stored in the memory 909 into an audio signal and output the audio signal as a sound. In addition, the audio output unit 903 may also provide audio output (for example, a call signal received sound or a message received sound) related to a specific function performed by the terminal 900. The audio output unit 903 includes a speaker, a buzzer, a telephone receiver, and the like.

The input unit 904 is configured to receive an audio or video signal. The input unit 904 may include a graphics processing unit (GPU) 9041 and a microphone 9042. The graphics processing unit 9041 processes image data of a static picture or a video that is obtained by an image capture apparatus (for example, a camera) in an image capture mode or a video capture mode. A processed image frame may be displayed on the display unit 906. An image frame processed by the graphics processing unit 9041 may be stored in the memory 909 (or another storage medium) or sent by the radio frequency unit 901 or the network module 902. The microphone 9042 can receive a sound and can process the sound into audio data. The processed audio data can be converted, for outputting, into a format that can be sent to a mobile communication base station through the radio frequency unit 901 in a telephone call mode.

The terminal 900 further includes at least one sensor 905, for example, an optical sensor, a motion sensor, and another sensor. Specifically, the optical sensor includes an ambient light sensor and a proximity sensor. The ambient light sensor may adjust brightness of a display panel 9061 based on intensity of ambient light. When the terminal 900 moves near an ear, the proximity sensor may disable the display panel 9061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 905 may further include a fingerprint sensor, a pressure sensor, an iris sensor, a molecular sensor, a gyroscope, a barometer, a hygrometer, a thermometer, or an infrared sensor. Details are not described herein.

The display unit 906 is configured to display information input by the user or information provided for the user. The display unit 906 may include a display panel 9061, and the display panel 9061 may be configured in the form of a liquid crystal display (LCD), an organic light-emitting diode (OLED), or the like.

The user input unit 907 may be configured to receive input digit or character information, and generate a key signal input related to a user setting and function control of the terminal. Specifically, the user input unit 907 includes a touch panel 9071 and other input devices 9072. The touch panel 9071, also referred to as a touchscreen, may capture a touch operation performed by a user on or near the touch panel (for example, an operation performed by the user on the touch panel 9071 or near the touch panel 9071 by using any appropriate object or accessory such as a finger or a stylus). The touch panel 9071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 910, and receives and executes a command sent by the processor 910. In addition, the touch panel 9071 may be implemented in a plurality of forms, for example, as a resistive, capacitive, infrared, or surface acoustic wave touch panel. The user input unit 907 may further include other input devices 9072 in addition to the touch panel 9071. Specifically, the other input devices 9072 may include but are not limited to a physical keyboard, a function key (such as a volume control key or a power on/off key), a trackball, a mouse, a joystick, and the like. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. In FIG. 10, the touch panel 9071 and the display panel 9061 serve as two independent components to implement input and output functions of the terminal. However, in some embodiments, the touch panel 9071 and the display panel 9061 may be integrated to implement the input and output functions of the terminal. This is not specifically limited herein.

The interface unit 908 is an interface for connecting an external apparatus to the terminal 900. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 908 may be configured to receive input (for example, data information and electric power) from the external apparatus, and transmit the received input to one or more elements in the terminal 900; or may be configured to transmit data between the terminal 900 and the external apparatus.

The memory 909 may be configured to store a software program and various data. The memory 909 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 909 may include a high-speed random access memory, or may include a non-volatile memory, for example, at least one magnetic disk storage device, a flash storage device, or other volatile solid-state storage devices.

The processor 910 is a control center of the terminal, connects various parts of the entire terminal by using various interfaces and lines, and executes various functions and data processing of the terminal by running or executing a software program and/or a module stored in the memory 909 and invoking data stored in the memory 909, so as to perform overall monitoring on the terminal. The processor 910 may include one or more processing units. Optionally, the processor 910 may integrate an application processor and a modem processor. The application processor mainly processes an operating system, a user interface, an application program, and the like. The modem processor mainly processes wireless communication. It may be understood that the modem processor may alternatively not be integrated into the processor 910.

The terminal 900 further includes the power supply 911 (for example, a battery) supplying power to all components. Optionally, the power supply 911 may be logically connected to the processor 910 through a power management system. In this way, functions such as charge management, discharge management, and power consumption management are implemented by using the power management system.

In addition, the terminal 900 includes some functional modules that are not shown. Details are not described herein.

Optionally, an embodiment of this disclosure further provides a terminal, including: a processor 910, a memory 909, and a computer program that is stored in the memory 909 and capable of running on the processor 910. When the computer program is executed by the processor 910, processes in the foregoing embodiments of the method for allocating PDSCH time domain resources are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the foregoing embodiments of the method for allocating PDSCH time domain resources are implemented, with the same technical effects achieved. To avoid repetition, details are not described herein again. For example, the computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, persons of ordinary skill in the art can still derive many variations without departing from the essence of this disclosure and the protection scope of the claims. All these variations shall fall within the protection of this disclosure.

What is claimed is:

1. A method for allocating physical downlink shared channel (PDSCH) time domain resources, applied to a terminal and comprising:
    starting buffering or receiving, by the terminal, a PDSCH no earlier than a time domain limiting location of the PDSCH, wherein when sub-carrier spacing (SCS) of a physical downlink control channel (PDCCH) is smaller than SCS of the PDSCH, a time domain location of the PDSCH is not earlier than the time domain limiting location of the PDSCH, wherein the PDCCH is used to schedule PDSCH;
    wherein the time domain limiting location of the PDSCH is for limiting a slot offset and/or a start OFDM symbol location of the PDSCH;
    wherein the time domain limiting location of the PDSCH is related to one or more of a first configuration value of the SCS of the PDCCH, a second configuration value of the SCS of the PDSCH, processing time of the PDCCH, a time domain length of the PDCCH, a start symbol location of the PDCCH, an end symbol location of the PDCCH, and a reference orthogonal frequency division multiplexing (OFDM) symbol;
    wherein a relationship between the time domain limiting location of the PDSCH and the one or more of the first configuration value of the SCS of the PDCCH, the second configuration value of the SCS of the PDSCH, the processing time of the PDCCH, the time domain length of the PDCCH, the start symbol location of the PDCCH, the end symbol location of the PDCCH, and the reference OFDM symbol is predefined in a protocol, or is configured by a network device, or is determined by the terminal;
    wherein the time domain limiting location of the PDSCH is determined in one of the following manners:
    (i) determining a first intermediate value based on the second configuration value and the first configuration value; and based on a correspondence that is preset in a system and that is between a time domain limiting location and the first intermediate value, determining, as the time domain limiting location of the PDSCH, a time domain limiting location corresponding to the first intermediate value, wherein the first intermediate value is the difference between the first configuration value and the second configuration value;
    (ii) determining a second intermediate value based on the second configuration value and the first configuration value; and based on a correspondence between a time domain limiting location and the second intermediate value, which is reported by the terminal, determining, as the time domain limiting location of the PDSCH, a time domain limiting location corresponding to the second intermediate value, wherein the second intermediate value is the difference between the first configuration value and the second configuration value;
    (iii) based on a correspondence that is preset in a system or is reported by the terminal and that is between a configuration value and the processing time of the PDCCH, determining a first processing time of the PDCCH corresponding to the first configuration value; and based on the first configuration value, the second configuration value, and the first processing time of the PDCCH, determining the time domain limiting location of the PDSCH.

2. The method according to claim 1, wherein the time domain limiting location of the PDSCH is related to the first configuration value of the SCS of the PDCCH, the second configuration value of the SCS of the PDSCH, and a location of the PDCCH that is relative to a boundary of each subunit time, wherein unit time in which the PDCCH is located comprises a preset quantity of subunit time.

3. A non-transitory computer-readable storage medium, wherein the computer-readable storage medium stores a computer program, and when the computer program is executed by a processor, the steps of the method for allocating physical downlink shared channel (PDSCH) time domain resources according to claim 1 are implemented.

4. A terminal for allocating physical downlink shared channel (PDSCH) time domain resources, comprising: a processor, configured to start buffering or receiving a PDSCH no earlier than a time domain limiting location of the PDSCH, wherein when sub-carrier spacing (SCS) of a physical downlink control channel (PDCCH) is smaller than SCS of the PDSCH, a time domain location of the PDSCH is not earlier than the time domain limiting location of the PDSCH, wherein the PDCCH is used to schedule PDSCH;

wherein the time domain limiting location of the PDSCH is for limiting a slot offset and/or a start OFDM symbol location of the PDSCH;

wherein the time domain limiting location of the PDSCH is related to one or more of a first configuration value of SCS of the PDCCH, a second configuration value of SCS of the PDSCH, processing time of the PDCCH, a time domain length of the PDCCH, a start symbol location of the PDCCH, an end symbol location of the PDCCH, and a reference orthogonal frequency division multiplexing (OFDM) symbol;

wherein a relationship between the time domain limiting location of the PDSCH and the one or more of the first configuration value of the SCS of the PDCCH, the second configuration value of the SCS of the PDSCH, the processing time of the PDCCH, a time domain length of the PDCCH, the start symbol location of the PDCCH, the end symbol location of the PDCCH, and the reference orthogonal frequency division multiplexing (OFDM) symbol is predefined in a protocol, or is configured by a network device, or is determined by the terminal;

wherein the time domain limiting location of the PDSCH is determined in one of the following manners:

(i) determining a first intermediate value based on the second configuration value and the first configuration value; and based on a correspondence that is preset in a system and that is between a time domain limiting location and the first intermediate value, determining, as the time domain limiting location of the PDSCH, a time domain limiting location corresponding to the first intermediate value, wherein the first intermediate value is the difference between the first configuration value and the second configuration value;

(ii) determining a second intermediate value based on the second configuration value and the first configuration value; and based on a correspondence between a time domain limiting location and the second intermediate value, which is reported by the terminal, determining, as the time domain limiting location of the PDSCH, a time domain limiting location corresponding to the second intermediate value, wherein the second intermediate value is the difference between the first configuration value and the second configuration value;

(iii) based on a correspondence that is preset in a system or is reported by the terminal and that is between a configuration value and the processing time of the PDCCH, determining a first processing time of the PDCCH corresponding to the first configuration value; and based on the first configuration value, the second configuration value, and the first processing time of the PDCCH, determining the time domain limiting location of the PDSCH.

5. The terminal according to claim 4, wherein the time domain limiting location of the PDSCH is related to the first configuration value of the SCS of the PDCCH, the second configuration value of the SCS of the PDSCH, and a location of the PDCCH that is relative to a boundary of each subunit time, wherein unit time in which the PDCCH is located comprises a preset quantity of subunit time.

* * * * *